(12) United States Patent
Lord

(10) Patent No.: US 9,020,996 B2
(45) Date of Patent: Apr. 28, 2015

(54) SYNTHETIC VIEW

(76) Inventor: Stephen P. Lord, Prior Lake, MN (US)

( * ) Notice: Subject to any disclaimer, the term of this patent is extended or adjusted under 35 U.S.C. 154(b) by 221 days.

(21) Appl. No.: 13/494,278

(22) Filed: Jun. 12, 2012

(65) Prior Publication Data

US 2012/0331021 A1    Dec. 27, 2012

Related U.S. Application Data

(60) Provisional application No. 61/500,848, filed on Jun. 24, 2011.

(51) Int. Cl.
  *G06F 12/00*  (2006.01)
  *G06F 17/30*  (2006.01)
  *G06F 7/00*   (2006.01)

(52) U.S. Cl.
  CPC .................................. *G06F 17/3015* (2013.01)

(58) Field of Classification Search
  CPC ................... G06F 17/30067; G06F 17/30091;
    G06F 11/1435; G06F 17/30194; G06F 3/0689;
    G06F 17/30233; G06F 17/30197; G06F
    17/30079; G06F 17/3007; G06F 17/30174;
    G06F 17/30106; G06F 17/30123

USPC ......... 707/609, 692, 695, 770, 781, 792, 822,
  707/827–829; 711/114, 117, 141, 154, 161,
  711/162, 173

See application file for complete search history.

(56) References Cited

U.S. PATENT DOCUMENTS

| | | | |
|---|---|---|---|
| 2002/0099745 A1* | 7/2002 | Huck et al. ..................... 707/532 |
| 2002/0120763 A1* | 8/2002 | Miloushev et al. ........... 709/230 |
| 2005/0055565 A1* | 3/2005 | Fournet et al. ................. 713/200 |
| 2007/0088702 A1* | 4/2007 | Fridella et al. .................. 707/10 |
| 2007/0271228 A1* | 11/2007 | Querel .............................. 707/3 |
| 2009/0201377 A1* | 8/2009 | Okano ....................... 348/207.1 |

* cited by examiner

*Primary Examiner* — Jason Liao
*Assistant Examiner* — Berhanu Mitiku

(57) ABSTRACT

One example method presents a synthetic view of data stored by a shared device file system. The synthetic view provides a "fictional" single namespace for data stored by the shared device file system. The method includes accepting a command to access data stored by the shared device file system. The command may be native to a user requesting the access. The command addresses the data stored by the shared device file system using the single namespace provided by the synthetic view. The method includes creating a replacement command(s) for accessing data stored by the shared device file system using one or more actual namespaces different from the single fictional namespace provided by the synthetic view. With the replacement command(s) prepared, the method proceeds to access data stored by the shared device file system using the replacement command(s).

25 Claims, 7 Drawing Sheets

SYNTHETIC VIEW

CROSS-REFERENCE TO RELATED APPLICATIONS

This application claims the benefit of U.S. Provisional Application 61/500,848 filed Jun. 24, 2011.

BACKGROUND

Shared disk file systems have supported numerous applications in numerous environments. Hierarchical storage management systems have also supported numerous applications in numerous environments. Shared disk file systems and hierarchical storage management systems may even have co-operated to support applications in different environments. Shared disk file systems and hierarchical storage management systems may have supported these environments using multiple namespaces to accommodate storing data in multiple heterogeneous storage pools. Having multiple namespaces to accommodate multiple heterogeneous storage pools may have required maintaining multiple concurrent views of data. A namespace refers to an abstract container or environment configured to hold a logical grouping of unique identifiers (e.g., file names). Data storage devices may use directories as namespaces. Some systems may have presented a single namespace to an application independent of where content is stored even though the system may use multiple internal mechanisms to represent the storage locations.

Some storage pools may have been bound to a specific host (e.g., a local disk). Other storage pools may have been available to a group of hosts (e.g., shared disk). Yet other storage pools may have been available geographically, even globally (e.g., cloud storage). Some storage pools may have had specific access points (e.g., tape library) while other storage pools may have had unique representations (e.g., deduplication block pool). Storage pools may have been located using a Universally Unique Identifier (UUID). In one example, a file system may have included a set of storage pools. All these possibilities created complexity that may have compromised or limited the usefulness or interoperability of these diverse approaches.

A shared disk file system may have been installed, for example, on hosts that were connected to the same disk array in a storage area network (SAN). A shared disk file system may have relied on both SAN connectivity and local area network (LAN) connectivity. SAN connectivity may have facilitated high performance while LAN connectivity using clustered gateway systems may have facilitated efficiency and fan-out. Maintaining multiple concurrent views of data using these multiple types of arrangements may have been difficult

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
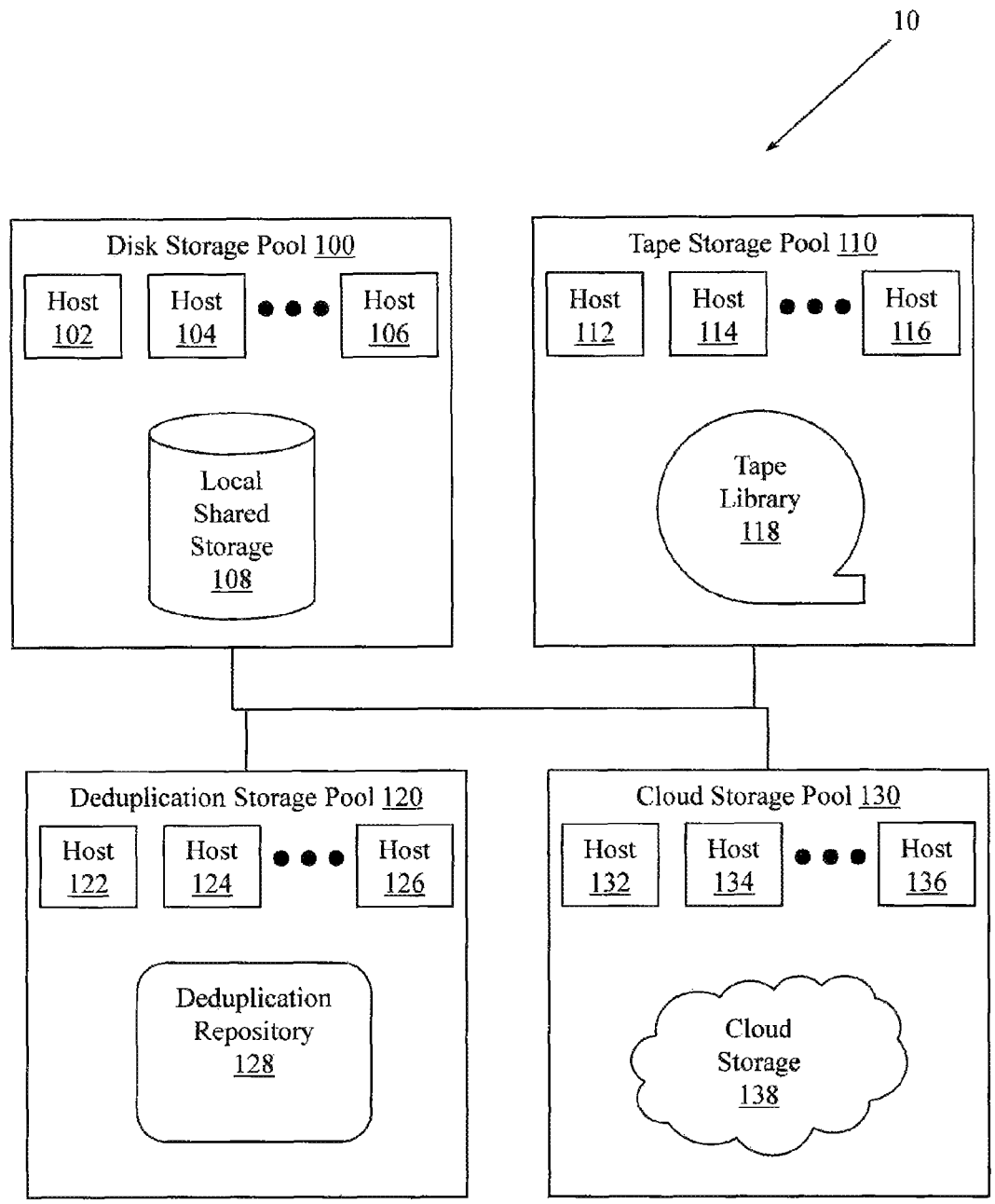
FIG. 1 illustrates storage pools.

Example apparatus and methods provide a synthetic view to a shared storage device file system, to a hierarchical storage management system, or to a shared storage device file system co-operating with a hierarchical storage management system. A synthetic view is not an actual view. Instead of seeing the actual organization, layout, storage locations, and other information associated with data stored by the shared storage device file system across heterogeneous storage pools, a user sees a fictional organization provided by example apparatus and methods. The fictional organization may be easier to understand and may agree with a view expected by the user or application. The fictional organization may also be referenced by users using commands, applications, and protocols that are native to or available to the users.

The synthetic view provides a single namespace for data stored across heterogeneous storage pools with different organizational mechanisms (e.g., disk, tape, solid state device (SSD), cloud, optical, deduplication). The single namespace may account for issues including, but not limited to, multiple data locations, multiple data encodings, and multiple data versions. The single namespace may also account for different portions of an item being stored on different devices. More generally, example apparatus and methods provide a synthetic view for items located on different devices using different approaches.

In one embodiment, items referenced by the single namespace provided by the synthetic view may be presented as a single hierarchy. The content of the items presented in the single hierarchy are made visible in the single namespace. In different embodiments, the synthetic view may make data in members of heterogeneous storage pools accessible from a single specific host, from a set of hosts, or globally. Global access may be associated with, for example, cloud storage and access.

In one embodiment, a synthetic view provides a single namespace that makes items (e.g., files) appear to be regular files in a hierarchical tree of a disk-based file system. The items may be accessed using conventional system calls or utility programs that treat the items as regular files and directories in a conventional hierarchy. Thus, well known file system semantics may be used to access component parts (e.g., files) in a well-known fashion, even though the component parts may be stored by the shared device file system on different storage devices in different storage domains in different locations according to different encodings. The single namespace that is accessible using conventional calls or approaches facilitates addressing the complexity to which users may have been exposed when dealing with multiple concurrent namespaces.

A shared device file system may have complex and varied storage demands. These demands may arise from simultaneously supporting one or more of, online tiering, archiving, deduplication, replication, migration, storage, partial file retrieval, and distributed data movers. Deduplication may improve the capacity and cost of primary storage. Deduplication for storage tiers may reduce future storage requirements while enabling data to be retained longer. Distributed data movers (DDMs) may increase the performance and scalability of storage tiers. Replication may enable data protection and data distribution solutions. Maintaining multiple namespaces to support interacting with multiple heterogeneous storage pools may have been unwieldy given the range and complexity of applications supported by shared disk file systems coupled with hierarchical storage management. Providing a single hierarchical namespace through a synthetic view may enhance the usefulness and interoperability of these diverse approaches. Example apparatus and methods hide this complexity and expose the single namespace to a user.

A shared disk file system may facilitate providing high-speed content sharing and cost-effective data archiving. A shared disk file system may be appropriate, therefore, for supporting environments that facilitate sharing large files (e.g., satellite image data) without network delays, that facilitate making a file available for access by multiple readers starting at different times (e.g., on-demand movie), and other high demand environments. A shared disk file system may also offer data sharing and retention in heterogeneous environments.

Moving data from one data management architecture to another data management architecture may be a substantial task. Migrating data may involve moving or otherwise manipulating potentially 100s of TBs or more of data that need to be realigned to a new storage paradigm. The task may be complicated when data is stored and managed in unique formats on different members of a heterogeneous environment. The task may be further complicated when multiple concurrent namespaces are involved. The migration may be even further complicated by complexities of storage and server hardware choices, labyrinths of network interconnects, and legal/business ramifications of losing or damaging data.

A shared device file system may enable simultaneous file access across heterogeneous platforms. In one embodiment, separate items referenced by the single namespace provided by the synthetic view may be individually checkable for consistency and other attributes.

A synthetic view that provides a single namespace for a shared storage device file system and a hierarchical storage management system may interact with storage that is arranged as a distributed backend that facilitates scalability. In one example, the distributed back end may employ federation as opposed to distributed object management.

A synthetic view that provides a single namespace for a shared storage device file system or a hierarchical storage management system may encapsulate the manipulation of a subset of items to a single location. In one embodiment, the manipulation may be encapsulation for performance reasons. Encapsulation refers to re-organizing the storage content of a number of related file system objects (e.g., a directory) into a single logical entity that can be read, written, removed, or relocated to other storage as a single object, while retaining the ability to catalog and access the individual component objects. Encapsulation and flattening may be used interchangeably herein. The single location may be, for example, a single data storage pool associated with a single storage device or single type of storage device (e.g., disk, tape, SSD). Encapsulating manipulation of a subset of content to a single node may be associated with, for example, a federated approach to distributing metadata. A federated approach may be employed instead of, for example, a complete shared access model.

The synthetic view may provide visibility across a number of heterogeneous data storage pools. The different storage pools may be associated with different types of devices including, but not limited to, disk, tape, cloud, SSD, optical storage device (OSD), and a deduplication storage pool. Items may be stored in one or more resource pools. The resource pools may range from storage that is bound to entities including, but not limited to, a specific host (e.g. local disk), a group of hosts (shared disk), other physical media that has specific access points (e.g. tape library), geographically accessible content such as cloud storage, and a block pool.

In one embodiment, a synthetic view that provides a single namespace may account for data movement caused by adding or removing storage pools. In one embodiment, the synthetic view may account for data movement caused by adding or removing devices from storage pools. In another embodiment, the synthetic view may account for automatically migrating data from or to a storage pool that is being added or removed. Similarly, the synthetic view may facilitate automatically migrating data from or to a device that is being added to or removed from a storage pool. These additions, removals, and movements are handled in a way that does not compromise the single namespace provided by the synthetic view. Supporting adding and/or removing devices from storage pools and removing and/or adding storage pools facilitates expanding capacity, replacing hardware, and other actions while still maintaining the synthetic view and thus the single namespace. Adding or removing devices from storage pools, and automatically migrating data from or to a storage pool that is being added or removed may have been complex and burdensome when maintaining multiple concurrent namespaces was involved.

In one example, a storage pool may be associated with a UUID. Thus, a storage pool may be located via the UUID. In this example, a file system may include a set of storage pools that can be located by UUIDs. In this example, an external storage pool may also be defined and known to the file system. The external storage pool may be implemented by a separate file system. In one example, the synthetic view facilitates accessing content from both internal and external storage pools and file systems.

A synthetic view may be provided for items that are stored on different devices. The different devices may have different encodings for items they store. For example, an item may be encoded differently on disk, on tape, on the cloud, and in a deduplication pool. Users may prefer not to deal with different encodings, preferring instead to have a consistent interface to data, regardless of where or how it is stored. Thus, the synthetic view and its single namespace may be configured to account for different encodings of items on different devices. Configuring the synthetic view to account for different encodings may include, for example, providing a generic mapping mechanism between file offset and storage device. The generic mapping may reside in a shared file system inode that supports providing a synthetic view.

In one embodiment, the synthetic view may support the presence of more than one copy of an item at a time. In different examples, the copies may reside on the same type of device in the same storage pool or may be distributed across different types of devices in different storage pools. Access to the different copies may be controlled, using, for example, priority based access methods. Once again, information about the multiple copies may be stored in the shared file system inode.

Different storage mechanisms may have different approaches to managing their content. Apart from disk storage and tape storage, the different storage mechanisms generally manage their own internal content placement. Thus, one difference between writing an item to cloud storage and writing an item to disk storage—apart from the data transfer mechanism—is the need for a space management application programming interface (API) to manage assigning a location for content in advance of storing the content.

By way of illustration, for disk storage, the process of adding content may involve selecting a location for new content, recording the location selected, and writing the content. For other types of storage, the process of adding content may involve writing the content and then recording the location where the content was stored. Both of these actions may have been preceded by selecting a device. Thus, example apparatus and methods may provide an API that facilitates hiding the different content adding actions that are taken for different devices and different pools.

A file system I/O (input/output) path may deal with several different access patterns including, but not limited to, random, sequential, demand paged memory mapped, and sparse objects. Different storage subsystems may be more or less appropriate for different patterns. Thus, attempting to map all patterns to a single model may negatively impact performance. For example, attempting to do memory mapped access directly to tape or attempting to do non-sequential access to dedupe content may produce undesirable performance. Therefore, example apparatus and methods may provide a layer between storage interfaces and a file system. In one embodiment, example apparatus and methods may even support non-file system API access to content where the overhead associated with random access is not needed. Providing this layer between storage interfaces and a file system recognizes that some storage media (e.g., tape) are much better suited to a post process model than a live access model. Therefore, example apparatus and methods may facilitate providing the synthetic view and accounting for different access patterns (e.g., random, sequential) and different process models (e.g., pre, post) using a layer between storage interfaces and a file system.

Example apparatus and methods may also be configured to address issues associated with content accessibility, lifetime, and space management. Consider that not all storage media are available in all locations. Thus, content may have to move to and from a media location(s). Since content may be moving, example apparatus and methods may be configured to address the concept of transient copies of content. For example, a local SSD cache may only be accessible on one node and thus may be managed as the only authoritative copy of the content until a more protected version is made.

Consider also that a file may be accessed on more than one node until the definitive copy of its content is available on more than one node. This may require defining where content is located. The definition may need to be private to a node. In this case, a node may add its own content to a system and manage its own non-shared state. However, this may in turn require mapping that local knowledge into the global knowledge of the file system so that the metadata can define where the content is located. This approach may allow shared metadata to record where private content is located and may also provide a chance of retrieving that content from the location after a crash. Supporting and managing transient copies as part of providing the synthetic view may create an issue concerning file system capacity. Thus, example apparatus and methods may be configured to address file system capacity analysis, reporting, and management as part of providing the synthetic view.

Example apparatus and methods may support different encodings of hierarchies. For example, a more frequently used hierarchy may be expanded or maintained as an actual hierarchy while a less frequently used hierarchy may be flattened or maintained as a flattened hierarchy. Encapsulation and flattening may be used interchangeably herein. Thus, example apparatus and methods may include the ability to flatten/expand directory trees based on access patterns. By way of illustration, an archival copy of a hierarchy can be moved to a flat format that resides in a simple container of storage. The content may still be browsed even though it is now stored as a single object. Although it may be browsed, access may be limited to read only access. Once content has been flattened, the content may be able to be moved as a unit to different storage locations for data replication and archive purposes as a single entity. In one example, the replication may occur between domains. Flattened content may itself be moved between encodings as a single unit. The flattening and single unit movement may be performed transparently to a user while maintaining the synthetic view.

Example apparatus and methods may also support policy driven movement of content while maintaining the synthetic view to the content. Policy driven movement may facilitate moving more frequently accessed items to faster access devices and moving less frequently accessed items to slower access devices while maintaining the synthetic view. Policy driven movement may also facilitate moving more sensitive data to higher security storage pools and moving less sensitive data to lower security storage pools while maintaining the synthetic view. Policy driven movement may also facilitate moving data geographically to be closer to users accessing that data while maintaining the synthetic view. The policy-based actions may be triggered when, for example, a threshold is passed. For example, a threshold number of accesses occurring within a pre-defined period of time may lead to data being migrated. In different embodiments, the policy driven movement may be transparent to users who are presented with the single namespace by the synthetic view.

Moving content may also include moving content between namespaces. This may involve both moving content between different namespaces where the complete content needs to be moved, and moving content where only references to geographically sharable data content need be passed. For example, replication where the backend data is stored in the cloud does not need to propagate the data, it only needs to propagate a reference to the data.

In one example, policy information may be maintained in a policy database. While a policy database may conventionally have been designed for search access, conventional file system interfaces and metadata may not have been designed for search access. Thus, example apparatus and methods may, while providing the synthetic view, facilitate maintaining synchronization between information in a policy database and metadata & content. In one embodiment, example apparatus and methods may make the criteria (e.g., size, security, access frequency, . . . ) upon which a policy decision is made more readily available to the policy to facilitate applying the policy in the synthetic view environment.

Example apparatus and methods may facilitate storing third party objects including, but not limited to, VMDK (virtual machine disk format) images, and LTFS (linear tape file system) tape images.

One specific embodiment of a synthetic view may be provided for StorNext and the StorNext Storage Manager, both of which are provided by Quantum Corporation. StarNext is a shared device (e.g., disk) file system. In one embodiment, the synthetic view may provide a single namespace to both StorNext and StorNext Storage Manager.

StorNext Storage Manager is a hierarchical storage management system. StorNext Storage Manager may provide data archival using, for example, a robotic tape library. A storage manager may provide high-speed content sharing and cost-effective data archiving.

StorNext and StorNext Storage Manager are configured to operate with snapshots. A snapshot represents an instantaneous representation of a group of files that are related both in a first attribute (e.g., functionality) and a second attribute (e.g., time). For example, an executable created at noon on Monday may have been built from a .c file and an .h file. A snapshot associated with the executable may include a representation of the .c file at the time the executable was created and a representation of the .h file at the time the executable was created. Example apparatus and methods support snapshots while maintaining the synthetic view. While a conventional "copy on write" approach to snapshots may be involved, example apparatus and methods allow supporting snapshots while maintaining the synthetic view even though some files in a snapshot may be located in different pools and even though some files in a snapshot may have been relocated after the snapshot was acquired. With this type of snapshot support available, snapshots and synthetic views may facilitate accessing old content, potentially replacing some traditional storage management interfaces. In one embodiment, a snapshot may become the presentation interface for archival content and versions. A snapshot may be visible in the single namespace provided by the synthetic view.

Redundant arrays of independent disks (RAID) have provided data protection for a period of years. However, as the disks used in RAID systems have grown bigger and bigger, the mean time between failure associated with reading a disk all the way through has grown correspondingly worse. Since RAID depends on being able to read all the way through a disk to recreate data from a failed disk, and since the mean time between failures is getting worse, a different approach for protecting data may be desired. Shared device file systems and related storage managers are, therefore, becoming more important in data protection. Thus, example apparatus and methods may be configured to protect data by maintaining copies of data rather than using RAID and to maintain those copies while preserving the single namespace provided by the synthetic view.

In one embodiment, a synthetic view provider may protect metadata and may protect data by maintaining multiple copies of the data or metadata in the shared device file system. In one embodiment, the different copies may be maintained on different devices in different storage pools. If a primary copy becomes compromised, example apparatus and methods may maintain the synthetic view while transparently shifting from the compromised copy to a secondary copy. In one embodiment, providing the synthetic view may include transparently maintaining mirror copies of content.

In one embodiment, metadata stores information that facilitates providing a view (e.g., hierarchical tree) of data. In one embodiment, the metadata may be stored to a device along with the data for which the metadata stores information. In another embodiment, the metadata may not be stored to a device along with the data for which the metadata stores representation information. While the metadata provides the ability to maintain a view, the metadata can be stored separately from the data. Thus, in one example, a target may not know the original view or structure of data it is storing. However, a source that provides a synthetic view may have that knowledge because the source may have access to the metadata. Example apparatus and methods facilitate storing metadata in different locations while maintaining the single namespace.

Figure one illustrates a single domain 10 that has four storage pools. The storage pools include a disk storage pool 100, a tape storage pool 110, a deduplication storage pool 120, and a cloud storage pool 130. The synthetic view hides the fact that data may move between pools. The synthetic view also hides the fact that data may be replicated in different storage pools. The movement and replication may be performed while maintaining the single namespace provided by the synthetic view. While four storage pools are illustrated, a synthetic view may be provided for a greater or lesser number of storage pools. Additional pools (e.g., SSD, optical, other) may also be employed.

Disk storage pool 100 may provide local shared disk storage 108 that is locally accessible to a set of hosts including host 102 and hosts 104 through 106. Tape storage pool 110 may provide a tape library 118 that is locally accessible to a set of hosts including host 112 and hosts 114 through 116. Deduplication storage pool 120 may provide a deduplication repository 128 that is locally accessible to a set of hosts including host 122 and hosts 124 through 126. Cloud storage pool 130 may provide cloud storage 138 that is accessible to hosts including hosts 132 and 134 through 136. Example apparatus and methods may be involved in moving data between storage pools while maintaining a synthetic view and single namespace to a user.

Figure two illustrates example content life cycles. At the top of figure two, a live namespace hierarchy 210 is illustrated being flattened and re-configured into a single object 212 while maintaining the live namespace with the synthetic view. The flattened namespace 212 is then illustrated being stored twice via tier copying, once to a geographically shareable cloud storage 214 and once to a disk backup appliance 224. The disk backup appliance 224 may be, for example, a DXi apparatus provided by Quantum Corporation. In the middle of figure two, a snapshot 220 is illustrated being stored once via tier copying to a deduplication repository 222. At the bottom of figure two, a snapshot 230 is illustrated having its namespace flattenend and being stored as a single object 232. The single object 232 is then stored once via tier migration to a tape library 224. During the processing of the items illustrated in figure two, the content remains visible through the synthetic view and accessible using the single namespace. Thus, content life cycle actions may be made transparently to a user whose synthetic view of the namespace is maintained.

While the original namespace hierarchy 210 may have included multiple objects, the flattened namespace hierarchy 212 may include just a single object. Flattening a namespace facilitates replacing a hierarchy of objects in the file system with one object. Even though multiple objects have been replaced with one object, the multiple objects may still appear to be individually addressable through the synthetic view. Thus, example apparatus and methods may maintain browse capabilities in a namespace, even after the namespace has been flattened. Flattening the namespace to replace multiple objects with a single object facilitates reducing the object count in the primary file system. Also, since the entire namespace can be represented by a single object, the flattening facilitates efficient movement of the content in the flattened namespace to other media (e.g., tape, cloud) even while maintaining the synthetic view.

In one embodiment, there may be multiple copies of content. In one example, the primary content may reside on random access storage and secondary copies of the content may reside on different, potentially multiple tiers. The location of the secondary copies may be decided based, for example, on performance, capacity, security, frequency of access, and other factors.

In one embodiment, example apparatus and methods may be configured to provide the synthetic view but to provide read only access to content. This read only access may facilitate providing some security in some situations.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure three illustrates a method 300. Method 300 includes, at 310, presenting a synthetic view. Additional detail about the presenting at 310 is included on figure four. Presenting the synthetic view at 310 may include presenting a synthetic view of data stored by a shared device file system. The synthetic view may provide a single namespace for data stored by the shared device file system. In one embodiment, presenting the synthetic view at 310 may include, at 311 (FIG. 4) providing simultaneous access to a file stored in different ways across heterogeneous platforms in the shared device file system.

In one example, presenting the synthetic view at 310 includes accessing 312 (FIG. 4) content from multiple locations. The locations may include, for example, an internal storage pool, an external storage pool, an internal file system, an external file system, and other locations. Presenting the synthetic view at 310 may also include simultaneously maintaining 313 (FIG. 4) more than one copy of an item (e.g., file, metadata).

Method 300 also includes, at 320, accepting a command to access data stored by the shared device file system. The command may address the data stored by the shared device file system based, at least in part, on the single namespace provided by the synthetic view. In one example, the command is native to a file system associated with a user from which the command was received, or to a utility associated with a user from which the command was received.

Method 300 also includes, at 330, creating one or more replacement commands to access data stored by the shared device file system. The one or more replacement commands address the data stored by the shared device file system based on one or more namespaces that are different from the single namespace provided by the synthetic view and by which the accepted command addressed the data.

In one embodiment, creating the one or more replacement commands at 330 includes manipulating an inode that provides a generic mapping between a file offset and a storage device. In one embodiment, manipulating the inode may include maintaining, in the inode, information concerning two or more copies of a file.

Method 300 also includes, at 340, accessing data stored by the shared device file system using the one or more replacement commands. Accessing the data may include reading the data, writing the data, deleting the data, and other actions.

Presenting the synthetic view at 310 may be an ongoing and dynamic process because the synthetic view may be representing data that is changing. For example, the shared device file system may store data on multiple devices. Devices may be added or removed. As devices are added or removed, the shared device file system may relocate data. Therefore, method 300 may include determining that the set of devices employed by the shared device file system has changed (e.g., device added, device removed) and then manipulating the synthetic view 314 (FIG. 4) to maintain the single namespace in light of the changes produced by the shared device file system relocating data.

Similarly, in one embodiment, the shared device file system may store data in multiple storage pools. Storage pools may be added or removed. As storage pools are added or removed, the shared device file system may relocate data. Therefore method 300 may include determining that a storage pool has been added or removed and then manipulating the synthetic view 315 (FIG. 4) to maintain the single namespace in light of the changes produced by the shared device file system relocating data.

In one embodiment, the shared device file system stores data using different encodings. Encodings can be changed. As encodings change, the representation of that data may also change. Therefore method 300 may include determining that the encoding of some data has changed and manipulating the synthetic view 316 (FIG. 4) to maintain the single namespace in light of the change.

In one embodiment, the shared device file system stores data on different tiers. Data can be moved between tiers. Therefore, method 300 may include determining that data has moved between tiers or that a tier has been added or deleted and then manipulating 317 (FIG. 4) the synthetic view to maintain the single namespace in light of the change.

The synthetic view presented at 310 reflects a dynamic situation. For example, a first portion of the data stored by the shared device file system may be stored in an expanded state and a second portion of the data stored in the shared device file system may be stored in a flattened state. But these states may not be permanent. Therefore, method 300 may include determining that a flattened-expanded state has changed for a portion of the data stored by the shared device file system, and then manipulating the synthetic view to maintain the single namespace in light of the change.

The dynamic nature of the data stored by the shared device file system may be controlled, at least in part, by a policy. By way of illustration, the shared device file system may, upon determining that an expansion threshold has been met by a selected flattened portion of data, selectively expand the selected flattened portion. Similarly, the shared device file system may be configured to determine that a flattening threshold has been met by a selected expanded portion of data and to selectively flatten the selected expanded portion. Presenting the synthetic view may include accounting for these ongoing flattenings and expandings.

The policies may also involve migration. By way of illustration, a shared device file system may be configured to determine that a migration threshold has been met by an item stored by the shared device file system and then to selectively move the item from one device to another device, from one storage pool to another storage pool, and in other ways. Moving an item may include, for example, moving the item from a device having a first access speed to a device having a second, different access speed, moving the item from a device having a first security level to a device having a second, different security level, moving the item from a device in a first geographic location to a device in a second, different geographic location, and moving the item from a first namespace to a second, different namespace.

Because data stored by the shared device file system may be moved between locations, devices, device types, encodings, and in other ways, method 300 may include manipulating the synthetic view to maintain the single namespace in light of the moving, flattening, expanding, or other actions.

Different data may be better accessed in different ways. Therefore, method 300 may include providing 318 (FIG. 4), through the synthetic view, application programming interface (API) based access to a selected item stored by the shared device file system, where the API based access is not file system based access.

A shared device file system may interact with numerous devices. Actions may occur concurrently or in parallel. Therefore, there may be a possibility for data to lose synchronization. Therefore, method 300 may include, at 319 (FIG. 4) managing a transient copy of an item stored by the shared device file system while maintaining an authoritative copy of the item. Additionally, method 300 may make either the transient copy or the authoritative copy or both copies visible in the single namespace. This may involve defining the location of the transient item by mapping local knowledge concerning the transient item to global knowledge possessed by the shared device file system, and defining the location of the authoritative copy of the item by mapping local knowledge concerning the authoritative copy of the item to global knowledge possessed by the shared device file system.

In one example, a method may be implemented as computer executable instructions. Thus, in one example, a computer-readable medium may store computer executable instructions that if executed by a machine (e.g., processor) cause the machine to perform method 300. While executable instructions associated with the method 300 are described as being stored on a computer-readable medium, it is to be appreciated that executable instructions associated with other example methods described herein may also be stored on a computer-readable medium.

Figure 5:
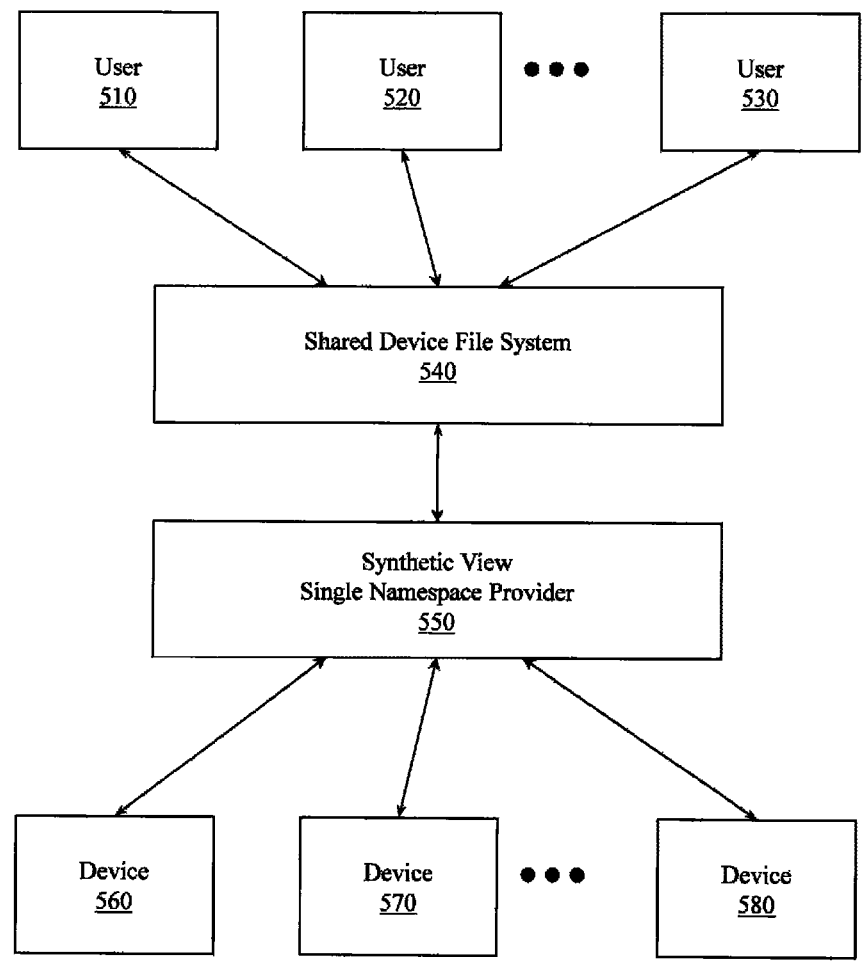
FIG. 5 illustrates an example synthetic view provider.

FIG. 5 illustrates a shared device file system 540 interacting with a synthetic view single namespace provider 550. Method 300 may be performed, for example, by a layer of hardware or software that is performing the role of the synthetic view single namespace provider 550.

Conventionally, the shared device file system 540 would interact on one side with users (e.g., user 510, user 520, . . . user 530) and would interact on another side with devices (e.g., device 560, device 570, . . . device 580). Example apparatus and methods provide the single namespace through the synthetic view provided by synthetic view single namespace provider 550.

A conventional system call or command may be presented to the shared device file system 540 by a user. The command may then be presented to provider 550. The command may address content based on the single namespace provided by the synthetic view by provider 550. As described above in connection with method 300 (FIG. 3), the provider 550 may create a different command(s) that use the actual namespace(s) needed to access data stored on the various devices.

Figure 6:
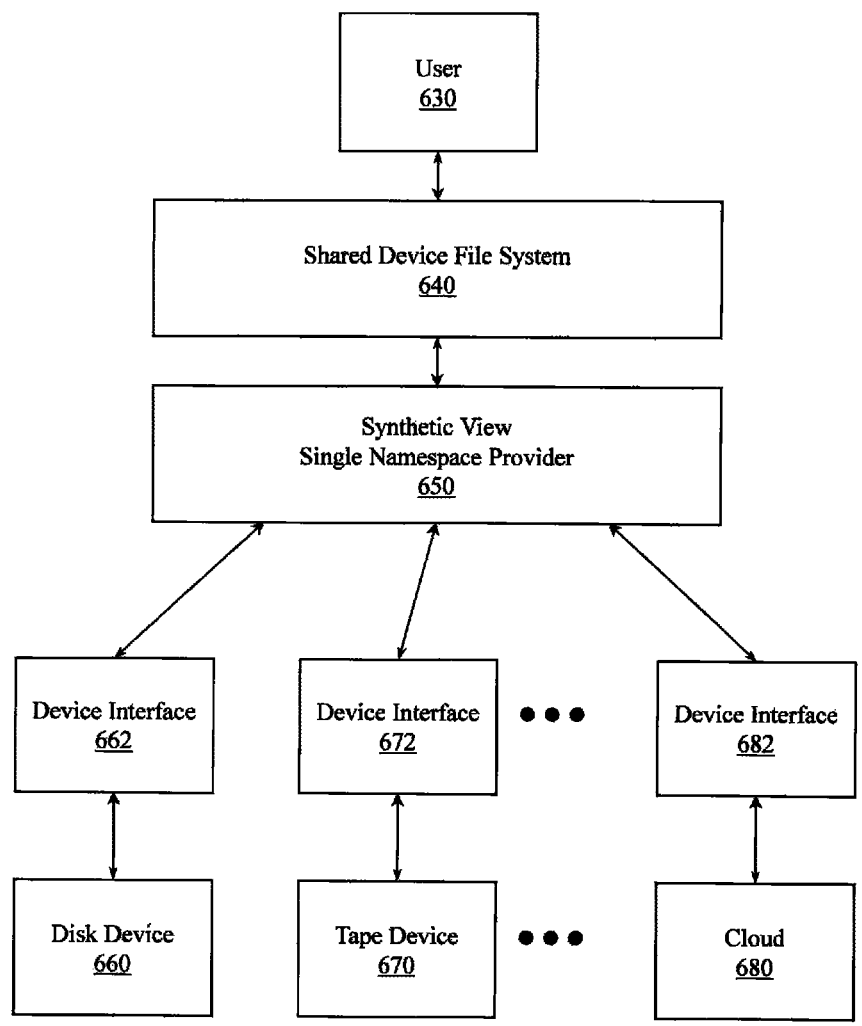
FIG. 6 illustrates an example synthetic view provider.

FIG. 6 illustrates a shared device file system 640 interacting with a user 630. The shared device file system 640 then interacts with a synthetic view single namespace provider 650. The provider 650 then interacts with a number of devices or data repositories (e.g., disk 660, tape 670, cloud 680) through device interfaces 662, 672, and 682. By inserting the provider layer 650, the shared device file system 640 does not need to account for each of the different devices and device interfaces. Instead, this complexity can be pushed down to the provider layer 650. The provider layer 650 can then provide the synthetic view to the shared device file system 640 and ultimately to user 630.

In one embodiment, the provider layer 650 may provide means for reconciling a data address associated with a single namespace provided by a synthetic view and an actual file offset associated with a storage device. The synthetic view presents the single namespace for data stored in a domain that spans across heterogeneous storage pools. The storage pools may include, but are not limited to, disk storage, tape storage, solid state device storage, cloud storage, optical storage, and deduplication storage. The single namespace accounts for data being stored in multiple data locations, data being stored using multiple data encodings, data being stored in multiple versions, different portions of an item being stored on different devices, and other situations that may arise when data is stored in heterogeneous storage pools by a shared device file system. In one embodiment the layer 650 may be provided by a process running on a computer. In another embodiment, the layer 650 may be a hardware device or circuit.

Figure 7:
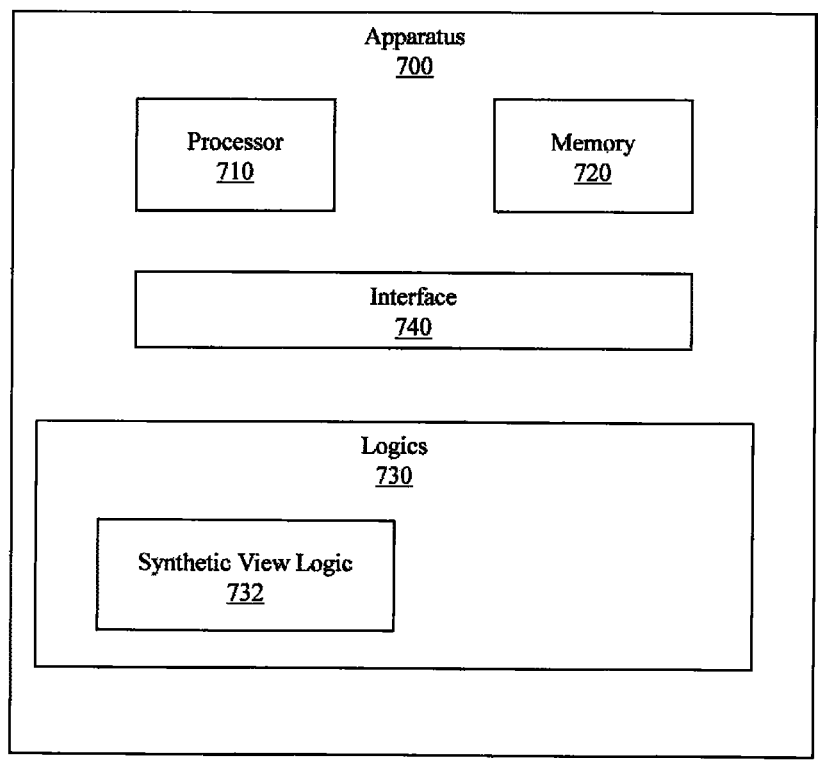
FIG. 7 illustrates an example apparatus associated with providing a synthetic view.

FIG. 7 illustrates an apparatus 700 that includes a processor 710, a memory 720, and a set 730 of logics that is connected to the processor 710 and memory 720 by an interface 740. The set 730 of logics may include a synthetic view logic 732. The synthetic view logic 732 may be configured to provide a shared device file system with a synthetic view that provides a single namespace for data stored across heterogeneous storage pools.

Providing the single namespace may involve tracking the device(s) on which a file is stored and a location(s) (e.g., offset) on the device where the data is stored. An inode (information node) stores this type of information. Since a shared device file system may store data on multiple devices, and may distribute a file between devices, in one example, synthetic view logic 732 is configured to manipulate an inode associated with the shared device file system. Manipulating the inode may include manipulating a generic mapping between a file offset and a storage device. Manipulating the inode may also include storing, in the inode, information concerning two or more copies of a file. This type of shared device file system inode differs from conventional inodes that store specific mappings as opposed to generic mappings. This type of shared device file system inode also differs from conventional inodes that can only store information about a single copy of a file.

The synthetic view logic 732 may be configured to maintain the single namespace while accounting for changes in, for example, the devices, locations, storage pools, and encodings encountered in the dynamic situation present in the heterogeneous storage environment. Thus, synthetic view logic 732 may be configured to respond to an addition of a device on which the shared device file system stores data, a removal of a device on which the shared device file system stores data, an addition of a storage pool on which the shared device file system stores data, a removal of a storage pool on which the shared device file system stores data, a flattening of a hierarchy stored by the shared device file system, an expanding of a hierarchy stored by the shared device file system, a migration between devices on which the shared device file system stores data, and a migration between storage pools on which the shared device file system stores data. Accounting for the changes may involve updating information from which the single namespace in the synthetic view is derived. This updating may occur without the knowledge of a consumer of the synthetic view.

The synthetic view logic 732 may be configured to accept a first command that addresses a piece of data stored by the shared device file system from the point of view of the single namespace. The synthetic view logic 732 may also be configured to create a replacement command that addresses the piece of data from a different point of view associated with a different namespace. By way of illustration, the shared device file system may actually be interacting with four different namespaces, one for a shared disk appliance, one for a tape appliance, one for a deduplication repository, and one for cloud storage. However, the synthetic view logic 732 may make these four namespaces appear to be a single hierarchical namespace.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and other permutations and combinations (e.g., the data store may store only A, only B, only C, A&B, A&C, B&C, A&B&C, A&A&A, A&A&B, A&A&B&B, A&A&B&B&C, A&A&B&B&C&C, etc.). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   presenting a synthetic view of data stored by a shared device file system, where the synthetic view provides a single namespace for data stored by the shared device file system, where a first portion of the data stored by the shared device file system is stored in an expanded state and where a second portion of the data stored in the shared device file system is stored in a flattened state;
   accepting a command to access data stored by the shared device file system, where the command addresses data stored by the shared device file system based, at least in part, on the single namespace provided by the synthetic view;
   creating one or more replacement commands to access data stored by the shared device file system, where the one or more replacement commands address data stored by the shared device file system based on one or more namespaces different from the single namespace provided by the synthetic view;
   accessing data stored by the shared device file system using the one or more replacement commands,
   determining that a flattened-expanded state has changed for a portion of the data stored by the shared device file system, and manipulating the synthetic view to maintain the single namespace in light of the change in the flattened-expanded state for the portion,
   upon determining that an expansion threshold has been met by a selected flattened portion of the data stored by the shared device file system, selectively expanding the selected flattened portion; and
   upon determining that a flattening threshold has been met by a selected expanded portion of the data stored by the shared device file system, selectively flattening the selected expanded portion.

2. The non-transitory computer-readable medium of claim 1, where creating the one or more replacement commands comprises manipulating an inode that provides a generic mapping between a file offset and a storage device.

3. The non-transitory computer-readable medium of claim 2, where manipulating the inode comprises maintaining, in the inode, information concerning two or more copies of a file.

4. The non-transitory computer-readable medium of claim 1, where the shared device file system stores data on N devices, N being an integer greater than one, and where the method includes:
   determining that N has changed due to one or more of, the addition of a device, and the removal of a device; and
   manipulating the synthetic view to maintain the single namespace in light of the change in N.

5. The non-transitory computer-readable medium of claim 1, where the shared device file system stores data in M storage pools, M being an integer greater than one, and where the method includes:
   determining that M has changed due to one or more of, the addition of a storage pool, and the removal of a storage pool; and
   manipulating the synthetic view to maintain the single namespace in light of the change in M.

6. The non-transitory computer-readable medium of claim 1, where the shared device file system stores data using X different encodings, X being an integer greater than one, and where the method includes:
   determining that X has changed; and
   manipulating the synthetic view to maintain the single namespace in light of the change in X.

7. The non-transitory computer-readable medium of claim 1, the method comprising:
   upon determining that a migration threshold has been met by an item stored by the shared device file system, selectively moving the item from one of, a first device and a first storage pool to one of, a second device and a second storage pool; and
   manipulating the synthetic view to maintain the single namespace in light of the moving.

8. The non-transitory computer-readable medium of claim 7, where moving the item comprises one or more of, moving the item from a device having a first access speed to a device having a second, different access speed, moving the item from a device having a first security level to a device having a second, different security level, moving the item from a device in a first geographic location to a device in a second, different geographic location, and moving the item from a first namespace to a second, different namespace.

9. The non-transitory computer-readable medium of claim 1, where providing the synthetic view comprises providing a hierarchical view that makes items stored by the shared device file system appear to be files in a tree of a local disk-based file system.

10. The non-transitory computer-readable medium of claim 1, where the command is native to one or more of, a file system associated with a user from which the command was received, and a utility associated with a user from which the command was received.

11. The non-transitory computer-readable medium of claim 1, where providing the synthetic view comprises providing simultaneous access to a file stored across heterogeneous platforms in the shared device file system.

12. The non-transitory computer-readable medium of claim 1, the method comprising encapsulating manipulation of a subset of items stored in the shared device file system to a single location, the single location being one of, a single data storage pool associated with a single storage device, and a single type of storage device, where the encapsulating is performed in a file system.

13. The non-transitory computer-readable medium of claim 1, where providing the synthetic view comprises accessing content from an internal storage pool, accessing content from an external storage pool, accessing content from an internal file system, and accessing content from an external file system, where an external storage pool can be located by a Universally Unique Identifier (UUID), and where an external storage pool can be located by a UUID.

14. The non-transitory computer-readable medium of claim 1, where providing the synthetic view comprises simultaneously maintaining more than one copy of an item, the item being one of, a file, and metadata about the file.

15. The non-transitory computer-readable medium of claim 1, the method comprising providing, through the synthetic view, application programming interface (API) based access to a selected item stored by the shared device file system, where the API based access is not file system based access.

16. The non-transitory computer-readable medium of claim 1, the method comprising:
managing a transient copy of an item stored by the shared device file system while maintaining an authoritative copy of the item, and
making one or more of, the transient copy of the item, and the authoritative copy of the item, visible in the single namespace.

17. The non-transitory computer-readable medium of claim 16, the method comprising:
defining the location of the transient item by mapping local knowledge concerning the transient item to global knowledge possessed by the shared device file system, and
defining the location of the authoritative copy of the item by mapping local knowledge concerning the authoritative copy of the item to global knowledge possessed by the shared device file system.

18. The non-transitory computer-readable medium of claim 1, the method comprising maintaining synchronization between information in a policy database associated with the shared device file system and metadata and content stored by the shared device file system.

19. The non-transitory computer-readable medium of claim 1,
where data in the shared device file system is stored using Y different tiers, Y being an integer greater than one, and where the method includes:
determining that Y has changed; and
manipulating the synthetic view to maintain the single namespace in light of the change in Y.

20. An apparatus, comprising:
a processor;
a memory;
a set of logics; and
an interface that connects the processor, the memory, and the set of logics;
the set of logics comprising:
a synthetic view logic that provides a shared storage device file system with a synthetic view that provides a single namespace for data stored across heterogeneous storage pools, where a first portion of the data stored by the shared device file system is stored in an expanded state and where a second portion of the data stored in the shared device file system is stored in a flattened state,
where providing the synthetic view includes determining that a flattened-expanded state has changed for a portion of the data stored by the shared device file system, and manipulating the synthetic view to maintain the single namespace in light of the change in the flattened-expanded state for the portion, and
where providing the synthetic view includes:
upon determining that an expansion threshold has been met by a selected flattened portion of the data stored by the shared device file system, selectively expanding the selected flattened portion; and
upon determining that a flattening threshold has been met by a selected expanded portion of the data stored by the shared device file system, selectively flattening the selected expanded portion.

21. The apparatus of claim 20, the synthetic view logic being configured to manipulate an inode associated with the shared device file system, where manipulating the inode includes one or more of, manipulating a generic mapping between a file offset and a storage device, and manipulating, in the inode, information concerning two or more copies of a file.

22. The apparatus of claim 21, the synthetic view logic being configured to maintain the single namespace in response to, an addition of a device on which the shared device file system stores data, a removal of a device on which the shared device file system stores data, an addition of a storage pool on which the shared device file system stores data, a removal of a storage pool on which the shared device file system stores data, a flattening of a hierarchy stored by the shared device file system, an expanding of a hierarchy stored by the shared device file system, a migration between devices on which the shared device file system stores data, and a migration between storage pools on which the shared device file system stores data.

23. The apparatus of claim 22, the synthetic view logic being configured to accept a first command that addresses a piece of data stored by the shared device file system from the point of view of the single namespace and to create a replacement command that addresses the piece of data from a different point of view associated with a different namespace.

24. The apparatus of claim 23, the synthetic view logic being configured to simultaneously maintain two or more copies of an item in the shared device file system, to track a transient copy of the item, and to track an authoritative copy of the item.

25. A non-transitory computer-readable medium storing computer-executable instructions that when executed by a computer cause the computer to perform a method, the method comprising:
- presenting a synthetic view of data stored by a shared device file system, where the synthetic view provides a single namespace for data stored by the shared device file system, where a first portion of the data stored by the shared device file system is stored in an expanded state and where a second portion of the data stored in the shared device file system is stored in a flattened state;
- accepting a command to access data stored by the shared device file system, where the command addresses data stored by the shared device file system based, at least in part, on the single namespace provided by the synthetic view;
- creating one or more replacement commands to access data stored by the shared device file system, where the one or more replacement commands address data stored by the shared device file system based on one or more namespaces different from the single namespace provided by the synthetic view;
- accessing data stored by the shared device file system using the one or more replacement commands, and
- determining that a flattened-expanded state has changed for a portion of the data stored by the shared device file system, and manipulating the synthetic view to maintain the single namespace in light of the change in the flattened-expanded state for the portion.

* * * * *

UNITED STATES PATENT AND TRADEMARK OFFICE
CERTIFICATE OF CORRECTION

| | | |
|---|---|---|
| PATENT NO. | : 9,020,996 B2 | Page 1 of 1 |
| APPLICATION NO. | : 13/494278 | |
| DATED | : April 28, 2015 | |
| INVENTOR(S) | : Stephen P. Lord | |

It is certified that error appears in the above-identified patent and that said Letters Patent is hereby corrected as shown below:

In the Specification:

In the Detailed Description:

In column 1, line 52, delete "difficult" and insert --difficult.--.

In column 7, line 1, delete "StarNext" and insert --StorNext--.

In column 8, line 6, delete "Figure one" and insert --FIG. 1--.

Figure 2:
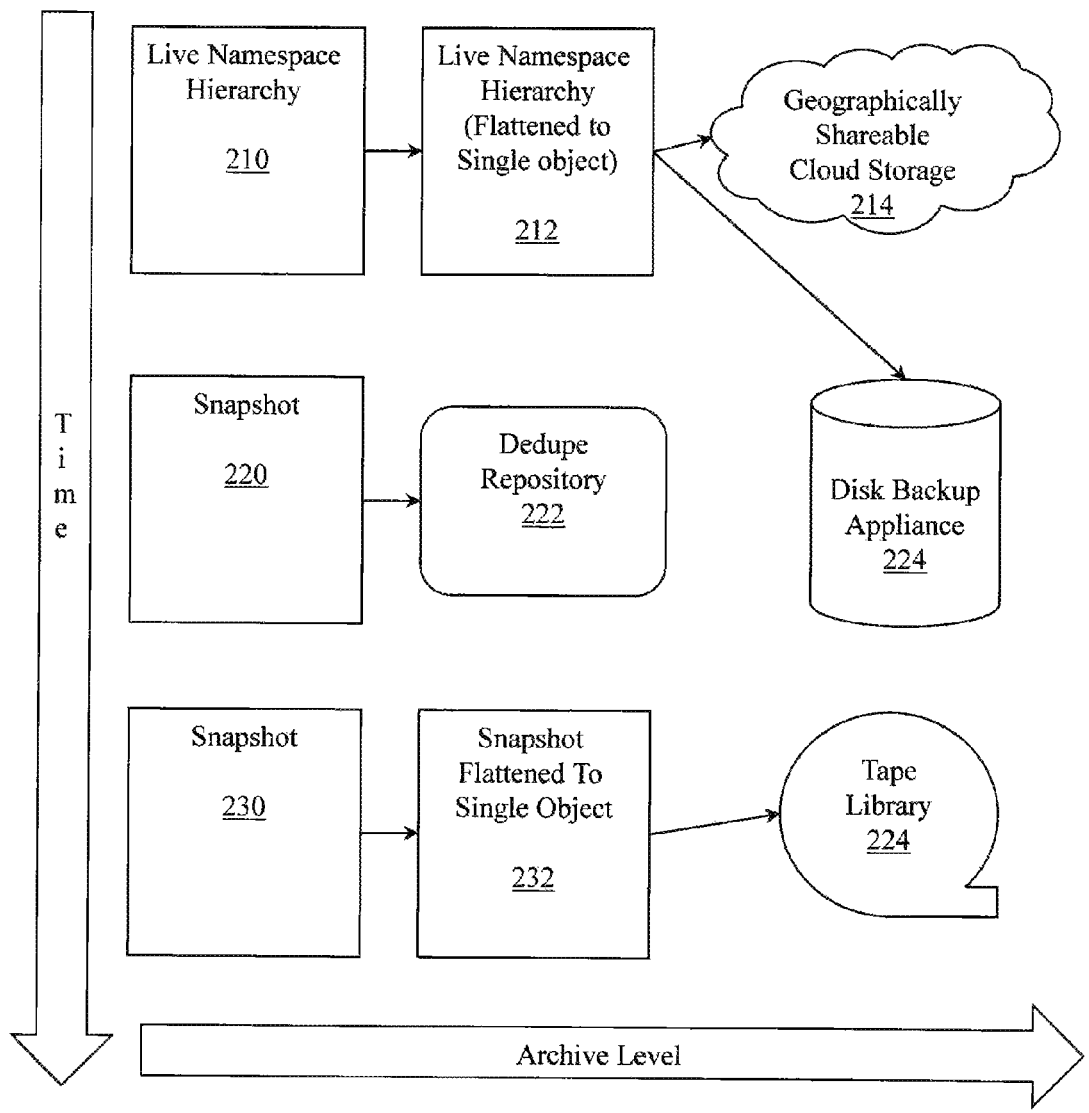
FIG. 2 illustrates content lifecycles.

In column 8, line 31, delete "Figure two" and insert --FIG. 2--.

In column 8, line 40, delete "figure two" and insert --FIG. 2--.

In column 8, line 42, delete "figure two" and insert --FIG. 2--.

In column 9, line 67, delete "tree) a" and insert --tree), a--.

Figure 3:
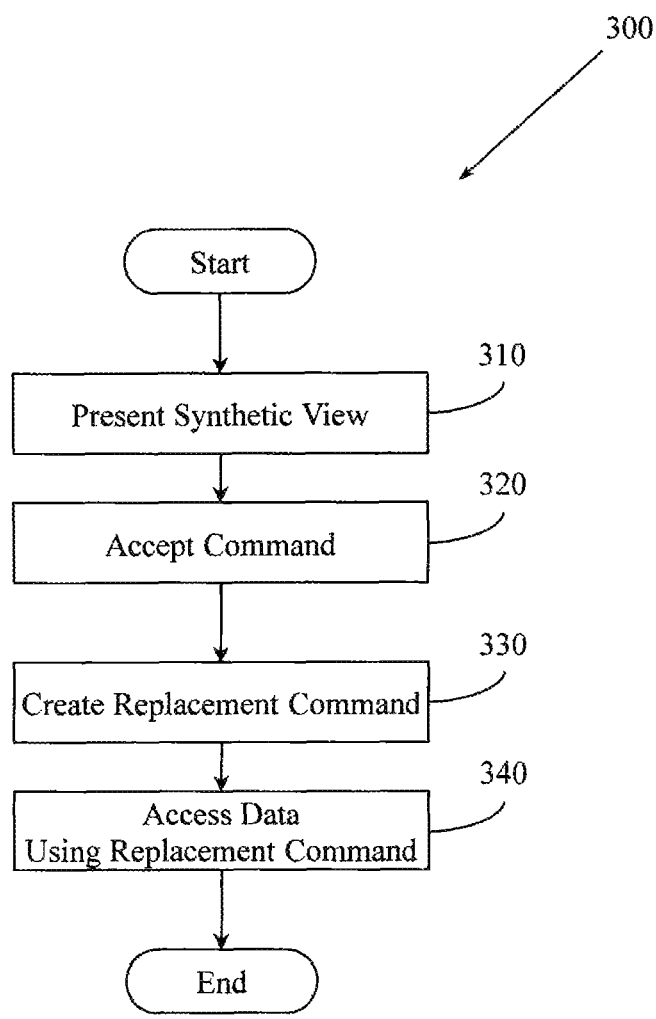
FIG. 3 illustrates an example method associated with providing a synthetic view.

In column 11, line 19, delete "Figure three" and insert --FIG. 3--.

Figure 4:
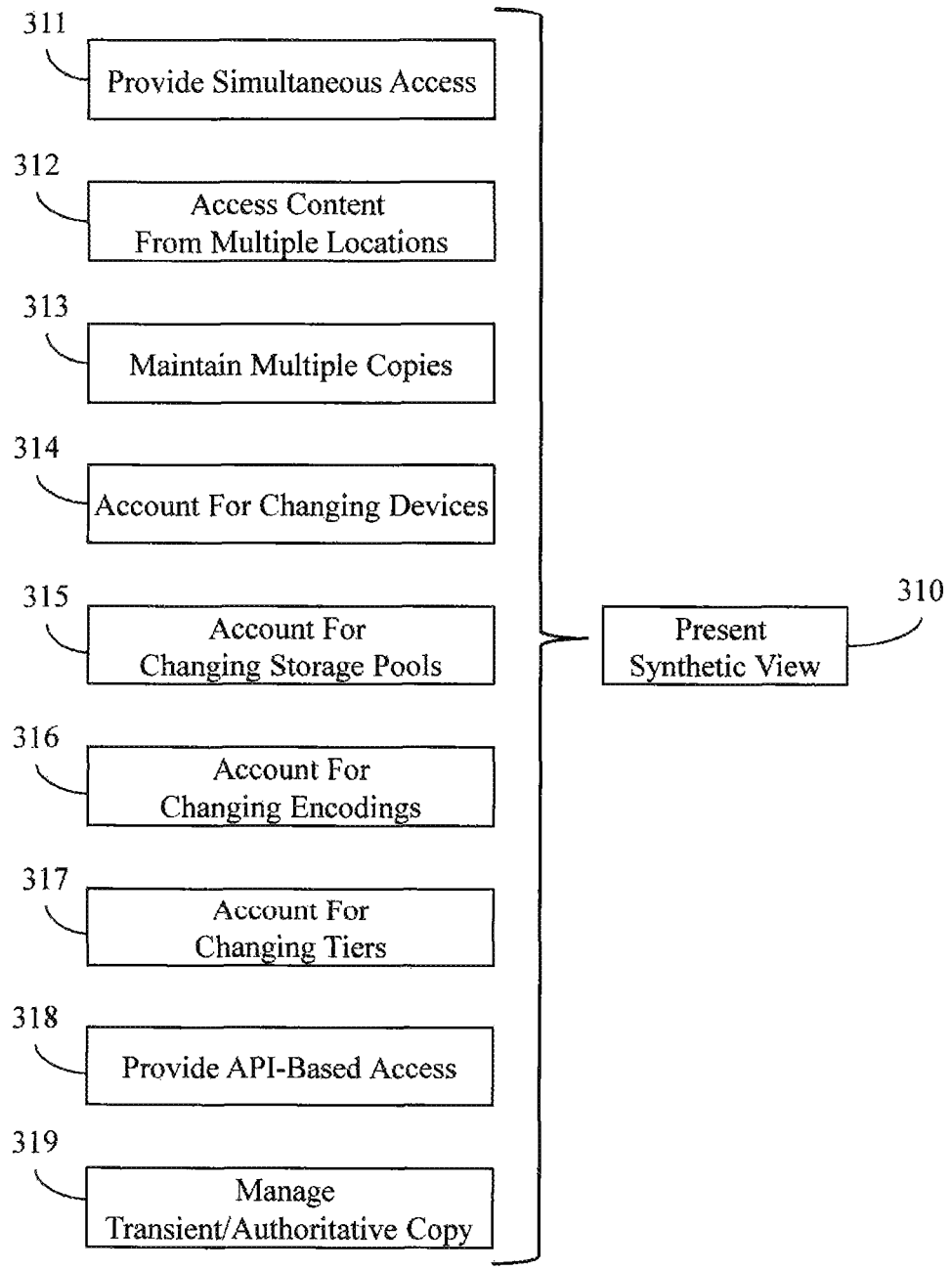
FIG. 4 illustrates additional detail concerning an element of an example method associated with providing a synthetic view.

In column 11, line 21, delete "figure four" and insert --FIG. 4--.

In column 14, line 15, delete "embodiment the" and insert --embodiment, the--.

In column 15, line 28, delete "both" then" and insert --both", then--.

Signed and Sealed this
Fifteenth Day of September, 2015

Michelle K. Lee
*Director of the United States Patent and Trademark Office*